(12) United States Patent
Nylund

(10) Patent No.: US 6,470,062 B1
(45) Date of Patent: Oct. 22, 2002

(54) NUCLEAR FUEL ASSEMBLY

(75) Inventor: Olov Nylund, Västerås (SE)

(73) Assignee: Westinghouse Atom AB, Vasteras (SE)

( * ) Notice: Subject to any disclaimer, the term of this patent is extended or adjusted under 35 U.S.C. 154(b) by 0 days.

(21) Appl. No.: 09/446,635

(22) PCT Filed: May 14, 1998

(86) PCT No.: PCT/SE98/00887
§ 371 (c)(1),
(2), (4) Date: Mar. 14, 2000

(87) PCT Pub. No.: WO99/00799
PCT Pub. Date: Jan. 7, 1999

(30) Foreign Application Priority Data

Jun. 27, 1997 (SE) ................................................ 9702474

(51) Int. Cl.⁷ ............................ G21C 3/00; G21C 3/322
(52) U.S. Cl. ....................... 376/433; 376/370; 376/371; 376/373; 376/439
(58) Field of Search .................. 376/370, 371, 376/377, 433, 439

(56) References Cited

U.S. PATENT DOCUMENTS

| | | | | |
|---|---|---|---|---|
| 3,137,635 A | * | 6/1964 | Morre et al. ................... | 176/43 |
| 3,247,650 A | * | 4/1966 | Kornbichler .................. | 55/185 |
| 5,091,146 A | | 2/1992 | Dix .............................. | 376/443 |
| 5,202,084 A | * | 4/1993 | Fennern et al. ............. | 376/433 |
| 5,491,733 A | * | 2/1996 | Patterson et al. ........... | 376/443 |
| 5,668,728 A | * | 9/1997 | Dix et al. .................... | 376/443 |
| 5,857,006 A | * | 1/1999 | Oosterkamp et al. ....... | 376/377 |
| 6,229,868 B1 | * | 5/2001 | Nylund et al. .............. | 376/433 |
| 6,236,701 B1 | * | 5/2001 | Nylund ........................ | 376/443 |

FOREIGN PATENT DOCUMENTS

| | | | |
|---|---|---|---|
| EP | 0 505 192 | | 9/1992 |
| WO | 96/20483 | * | 7/1996 |
| WO | 97/49096 | * | 12/1997 |

* cited by examiner

Primary Examiner—Michael J. Carone
Assistant Examiner—Jack Keith
(74) Attorney, Agent, or Firm—Connolly Bove Lodge & Hutz, LLP; Larry J. Hume

(57) ABSTRACT

A fuel assembly for a boiling water reactor which is designed to allow water, during operation of the reactor, to flow upwards through the fuel assembly while absorbing heat from a plurality of fuel rods, whereby part of the water is transformed into steam. The fuel assembly comprises a first steam pipe (10a) arranged with its longitudinal axis parallel to the longitudinal axis of the fuel assembly and the steam pipe comprises an inlet for the steam arranged in the first end of the steam pipe and an outlet for the steam arranged in the second end of the steam pipe. The fuel assembly also comprises a second steam pipe (10b) arranged above and at a distance from the first steam pipe such that an opening is formed between the steam pipes. The outlet of the first steam pipe has a diameter which is larger than the diameter of the inlet of the second steam pipe.

10 Claims, 4 Drawing Sheets

NUCLEAR FUEL ASSEMBLY

TECHNICAL FIELD

The present invention relates to a fuel assembly for a boiling water reactor which is adapted, during operation of the reactor, to allow cooling water to flow upwards through the fuel assembly while absorbing heat from a plurality of fuel rods, whereby part of the cooling water is transformed into steam, and where the fuel assembly comprises a steam pipe through which the steam flows upwards through the fuel assembly towards the outlet end thereof.

BACKGROUND ART

In a boiling water nuclear reactor, moderated by light water, fuel exists in the form of fuel rods, each one containing a stack of pellets of a nuclear fuel arranged in a cladding tube. A fuel bundle comprises a plurality of fuel rods arranged in parallel with one another in a certain definite, normally symmetrical, pattern, a so-called lattice, and are retained at the top by a top tie plate and at the bottom by a bottom tie plate. A fuel assembly comprises one or more fuel bundles, each one extending along the main part of the length of the fuel assembly and being surrounded by a substantially square fuel channel.

The core is immersed into water which serves both as coolant and as neutron moderator. The fuel assemblies are arranged vertically in the core and spaced from each other. During operation, the water is admitted through the bottom of the fuel assembly and then flows upwards through the fuel assembly past the fuel rods. The fuel rods emit heat which is taken up by the water which starts boiling, whereby part of the water is transformed into steam. The water and the steam are passed out through the upper end of the fuel assembly.

The produced steam is delivered to turbines which drive generators where electrical energy is generated.

A disadvantage with a boiling reactor is the high proportion of steam in the upper part of the fuel assembly. When the proportion of steam rises in the coolant, its ability to carry off heat from the fuel rods is reduced, thus increasing the risk of dryout, which in turn leads to an increase of the risk of fuel damage. Still another problem with a high steam volume in the fuel is that steam is much inferior to water as moderator, which results in the moderation being insufficient whereby the fuel is utilized inefficiently. In the lower part of the fuel assembly, the moderator consists of water whereas the moderator in the upper part of the fuel assembly consists of both steam and water. This means that the fuel in the upper part of the fuel assembly cannot be utilized efficiently. It is, therefore, desirable to keep down the steam volume in the coolant while at the same time maintaining the steam generation at a high level.

U.S. Pat. No. 5,091,146 discloses a fuel assembly which attempts to achieve a separation of the steam flow and the water flow in the upper part of the fuel assembly by arranging a pipe above one or more part-length fuel rods, that is, fuel rods extending from the bottom tie plate but terminating below and at a distance from the top tie plate. When designing the pipe, there are primarily two problems which have to be solved, namely, how the steam, which is continuously produced along the upper part of the fuel assembly, is to enter the pipe, and also how the water, which is deposited on the inner walls of the pipe, is to be carried away. These problems have been solved by providing the envelope surface of the pipe with a number of openings arranged axially at different levels. Some of the openings are formed so as to carry away the water which is accumulated on the inner surfaces of the pipe, and other openings are formed for passing the steam into the pipe. The openings which are intended for passing in the steam are complicated in their design and it is doubtful whether the steam can really find its way through these openings. An additional disadvantage is that the openings are complicated to manufacture.

SUMMARY OF THE INVENTION

The object of the invention is to produce a fuel assembly with a steam pipe, which in an efficient way separates steam from water, which passes the steam out of the fuel assembly, and which is simple to manufacture.

What characterizes a fuel assembly according to the invention will become clear from the appended claims.

A fuel assembly according to the invention comprises a plurality of steam pipes arranged one above the other with their longitudinal axes parallel to the longitudinal axis of the fuel assembly. During operation, the fuel assembly is arranged vertically in the core and steam flows upwards through the steam pipes. The steam pipe has an inlet for the steam in one of its ends, the inlet end, and an outlet for the steam in its other end, the outlet end. The steam pipes are arranged spaced from one another such that openings are formed between the steam pipes. These openings have two functions; for one thing, steam is to flow into the steam pipes and, for another, the water which is formed on the insides of the steam pipes is to be passed out. The envelope surfaces of the steam pipes therefore need not be provided with special openings for admission of steam and discharge of water.

To separate the water from the insides of the steam pipe and prevent it from following the steam flow into the next steam pipe, the outlet and inlet of the steam pipes are designed such that the internal radius of the outlet is larger than the external radius of the inlet. The distance between two steam pipes shall be so large that it provides a sufficient inflow area for the steam while at the same time it must not be so large that the separated water has time to be deflected to such an extent that it follows the steam up into the next steam pipe. Preferably, the opening between the steam pipes shall have an area which is of the order of magnitude of near the cross-section area of the steam pipe.

The water on the inside of the steam pipe forms a coherent water film. In one embodiment of the invention, the outlet end of the steam pipe is provided with means for collecting water from the water film and leading the collected water towards the outlet. In this way, large water drops are formed in localized paths. These large water drops are not deflected as easily as smaller water droplets, which reduces the risk of the water being brought in with the steam. When the water drops are collected in paths, almost water-free paths are also formed between the paths with water drops, and in these water-free paths the steam may flow into the steam pipe without being obstructed. In this way, the risk of the water drops preventing the steam from flowing into the steam pipe is reduced.

To facilitate the inflow of steam to the steam pipe, the oppositely positioned inlet and outlet ends may be designed tapering towards the openings for venturi effect.

BRIEF DESCRIPTION OF THE DRAWINGS

FIG. 1c shows a cross section Ic–Ic' through the fuel assembly in FIG. 1a.

DESCRIPTION OF THE PREFERRED EMBODIMENTS

Figure 1A:
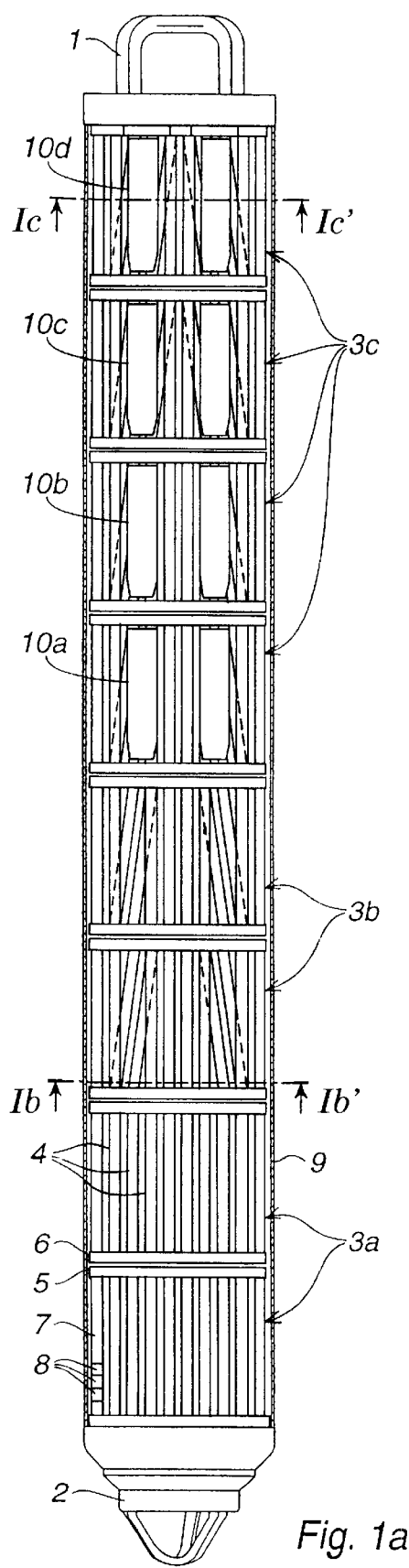
FIG. 1a shows a fuel assembly comprising steam pipes according to a first embodiment of the invention.
Figure 1B:
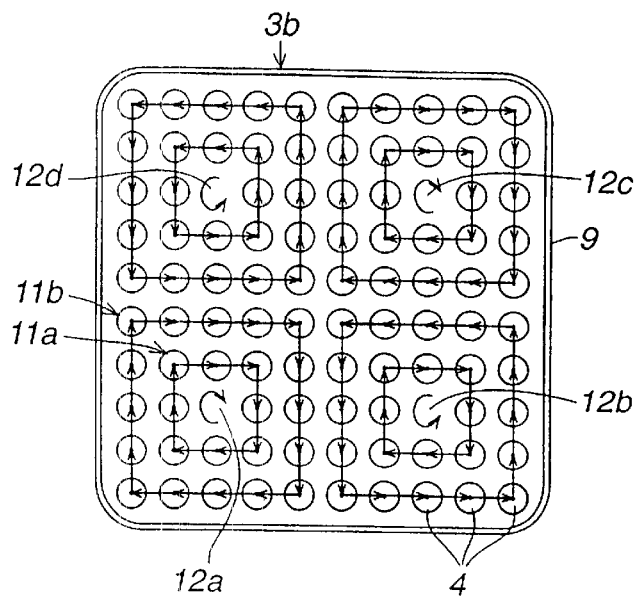
FIG. 1b shows a cross section Ib–Ib'.
Figure 1C:
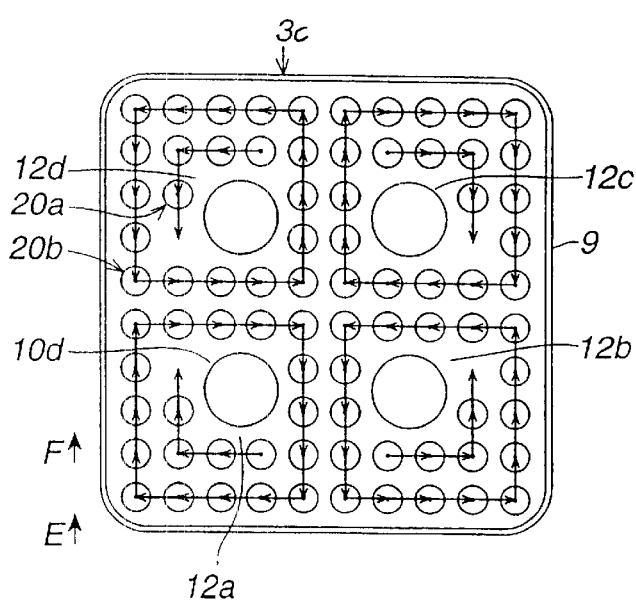

FIG. 1a shows an embodiment of a fuel assembly according to the invention. During operation, the fuel assembly is arranged vertically in the reactor core. FIG. 1b shows a vertical section Ib–Ib' through the fuel assembly, and FIG. 1c shows a vertical section Ic–Ic' through the fuel assembly. The fuel assembly comprises an upper handle 1, a lower end portion 2 and a plurality of fuel units 3a, 3b and 3c stacked on top of each other. Each fuel unit comprises a plurality of fuel rods 4 arranged between a top tie plate 5 and a bottom tie plate 6. The fuel units are stacked on top of each other in the longitudinal direction of the fuel assembly and they are stacked in such a way that the top tie plate 5 in one fuel unit is facing the bottom tie plate 6 in the next fuel unit in the stack a fuel rod 4 comprises fuel in the form of a stack of uranium pellets arranged in a cladding tube 7. The fuel assembly is enclosed in a fuel channel 9 of substantially square cross section. In this embodiment, the fuel assembly comprises eight fuel units.

A fuel unit has 100 fuel rod positions in an orthogonal 10×10 lattice. A fuel rod position is a position in the lattice in which it is possible to arrange a fuel rod. All the positions in the lattice need not be occupied by fuel rods. The fuel unit is divided into four sub-bundles with 25 fuel rod positions in an orthogonal 5×5 lattice. The lattice in one sub-bundle comprises a fuel rod position in the centre of the sub-bundle, and around this an inner square ring is arranged consisting of 8 fuel rod positions. Outside the inner ring, there is an outer square ring consisting of 16 fuel rod positions.

The fuel assembly comprises three different types of fuel units 3a, 3b, 3c. In the two lowermost fuel units 3a, all the fuel rod positions are occupied by fuel rods which are arranged in parallel with the longitudinal axis of the fuel assembly. The fuel rods in the fuel units 3b and 3c are arranged so as to be inclined between the bottom tie plate and the top tie plate. In one sub-bundle, all the fuel rods in the two rings are inclined in the same direction, that is, either clockwise or counterclockwise around the centre of the sub-bundle. The purpose of inclining the fuel rods around the centre of the sub-bundle is to set water and steam, which flow upwards through the fuel assembly, into rotation, thus achieving a separation of water and steam. Such a fuel assembly is known from Swedish patent specification No. 96024476.

The fuel unit 3b has 96 fuel rods distributed among four sub-bundles. Each one of the sub-bundles comprises 24 fuel rods arranged in an inner ring 11a and an outer ring 11b. The fuel rods are inclined in the direction of the arrows, that is, around the centre of the sub-bundle. The fuel rod position in the centre of the sub-bundle is unoccupied. In this way an empty volume is created in the centre of the fuel bundle. The empty volume constitutes the lower part of a vertical channel which extends through the six uppermost fuel units in the fuel assembly.

There are four channels 12a, 12b, 12c, 12d extending through the fuel assembly, one channel in each sub-bundle. The inclined fuel rods in the sub-bundle bring about an eddy of water and steam around the channel. The direction of the eddies is marked by arrows in the channel. In this eddy, the water and the steam are separated from each other by the water being thrown outwards while at the same time the steam is pressed against the centre of the eddy.

The four uppermost fuel units 3c each have 80 fuel rods distributed among four sub-bundles. In each sub-bundle, the fuel rod position in the centre and four positions in the inner ring are unoccupied, thus forming an empty volume which extends through the sub-bundle. The empty volumes contribute to the four channels 12a–12d which extend through the fuel assembly. In each one of the channels, four steam pipes 10a, 10b, 10c and 10d are arranged one above the other such that their longitudinal axes coincide with one another. Through the steam pipes, the steam is conducted towards the outlet of the fuel assembly. In this embodiment, all the steam pipes are designed identically. Each fuel unit 3c comprises four steam pipes arranged between the bottom tie plate and the top tie plate.

Figure 2:
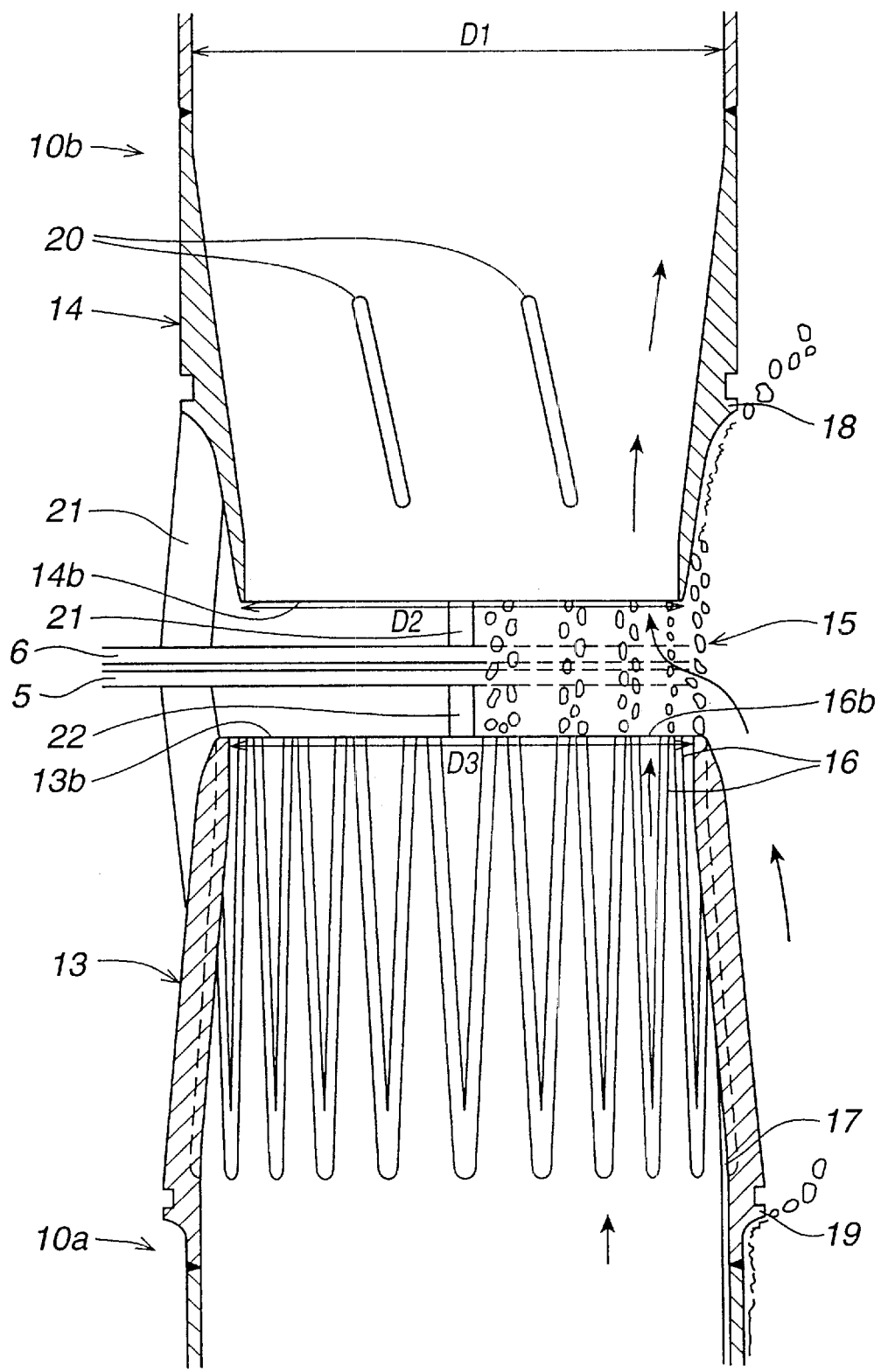
FIG. 2 shows in more detail how an inlet end and an outlet end for a steam pipe may be designed.

FIG. 2 shows in more detail how a steam pipe may be designed. The lower end 14 of the steam pipe, hereinafter referred to as the inlet end of the steam pipe, has an opening which constitutes an inlet 14b for the steam. The upper end 13 of the steam pipe, hereinafter referred to as the outlet end of the steam pipe, has an opening which constitutes an outlet 13b for steam and water which have accumulated on the inner side of the steam pipe. The outlet end of the first steam pipe 10a is arranged at a distance from the inlet end of the next steam pipe 10b. The inlet end of the steam pipe has an outer diameter D2 which is smaller than the diameter D3 of the opening in the outlet end. In this way, the water 15 emanating from the inside of the first steam pipe is thrown out at a distance from the inlet of the next pipe, thus separating the water from the steam which continues up through the next steam pipe. The distance between two steam pipes shall be so large as to provide a sufficient inflow area for the steam while at the same time it must not be so large that the separated water has time to be deflected to such an extent that it follows the steam up into the next steam pipe. Preferably, the opening between the steam pipes shall have an area which is of an order of magnitude near the cross-section area of the steam pipe, which is determined by the diameter D1 of the steam pipe. The arrows in the figure show the direction of the steam flow.

The inflow of the steam is facilitated by designing the outlet ends and inlet ends of the steam pipes such that venturi effect is obtained. For this purpose, the inlet ends and the outlet ends are arranged such that they are tapering towards the opening. The diameter D2 of the inlet and the diameter D3 of the outlet are to be smaller than the diameter D1 of the steam pipe.

The inside of the outlet end 13 is provided with slightly angularly adjusted grooves 16 which open out into the outlet. The task of these grooves is to collect water from the water film 17 which covers the inside of the steam pipe and to concentrate the water to the orifices 16b of the grooves. In this way, large water drops are formed in localized paths. One advantage of this is that large water drops are not deflected as easily as smaller water drops and hence the risk of the water accompanying the steam into the next steam pipe is reduced. In addition, the localized paths with water cause formation of water-free paths between these first-mentioned paths, through which steam may flow into the next steam pipe without being obstructed.

The inlet end 14 is provided with a rejection edge 18 and the outlet end 13 is provided with a rejection edge 19 for scraping off the water which is transported along the outside of the steam pipe. To reinforce the formation of the water film on the inside of the steam pipe, the inside of the steam pipe may be provided with oblique vanes 20. Alternatively, vanes may be arranged in the bottom tie plate 6. The inlet end of the steam pipe is attached to the bottom tie plate 6 with a plurality of attachment means 21 and the outlet end of the steam pipe is attached to the top tie plate 5 with a plurality of attachment means 22.

Figure 3:
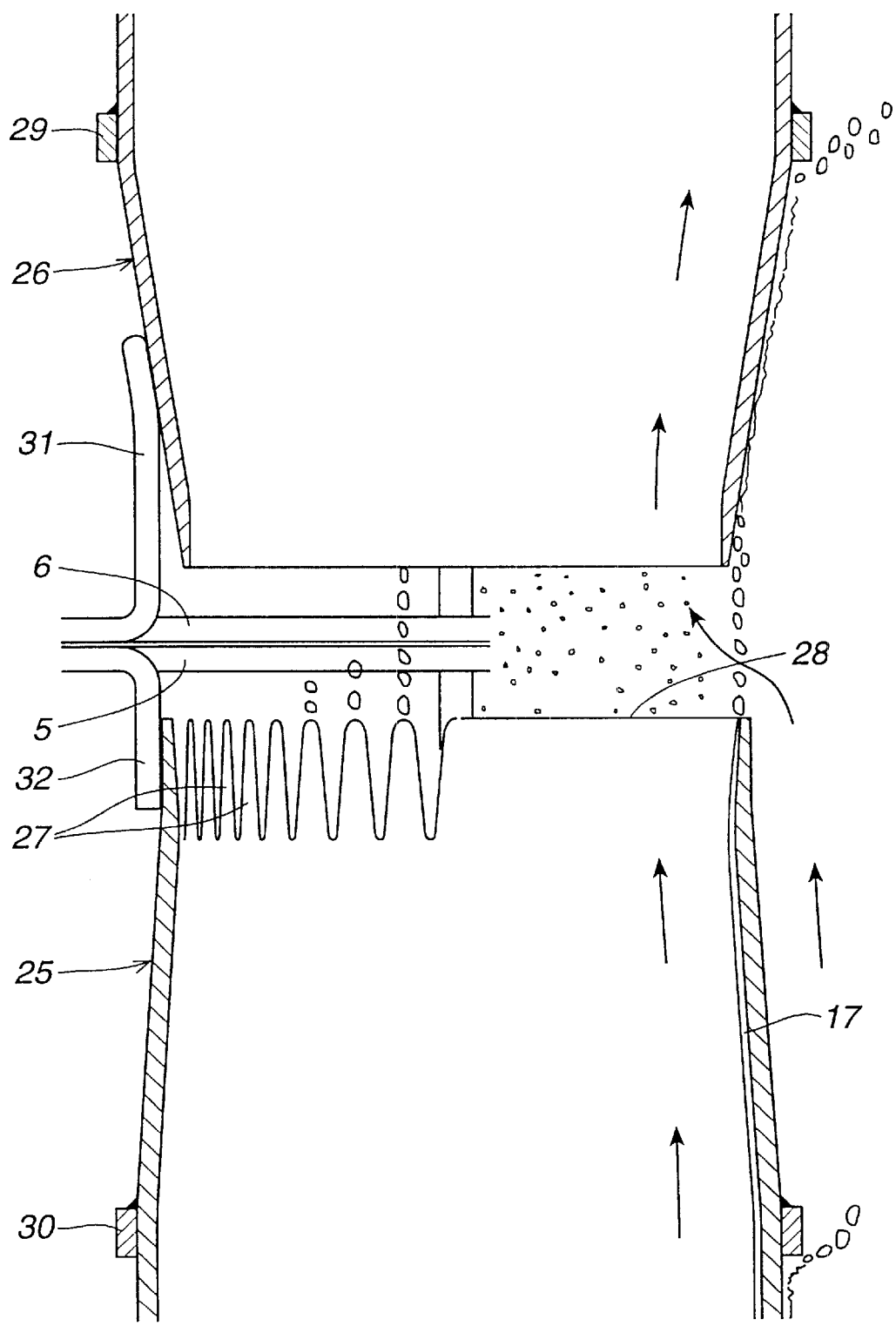
FIG. 3 shows another embodiment of the inlet end and the outlet end of the steam pipe.

FIG. 3 shows another example of how the outlet end 25 and the inlet end 26 of the steam pipe may be designed. The opening edge of the outlet end is provided with lugs 27. The lugs have the same function as the grooves in the preceding example, namely to form large water drops in localized paths. The figure shows the difference between the shape of the water drops when the opening edge is provided with lugs 27 and when the opening edge is straight 28. At the straight opening edge, a curtain with smaller water drops is formed which risk penetrating into the opening between the steam pipes. The steam pipe is provided with a rejection ring 29 on its inlet end and with an additional rejection ring 30 at its outlet end. The task of the rejection rings is to remove the water which is accumulated on the outside of the steam pipe. The outlet end of the steam pipe is attached to the top tie plate 5 with attachment means 32 and the inlet end of the steam pipe is attached to the bottom tie plate 6 with attachment means 31.

Swedish patent document 9604720-4 shows a fuel assembly with fuel units stacked on top of each other, in which the fuel rods are arranged in a polar lattice comprising a number of concentric rings. In such a fuel assembly, the invention may be advantageously applied.

Figure 4:
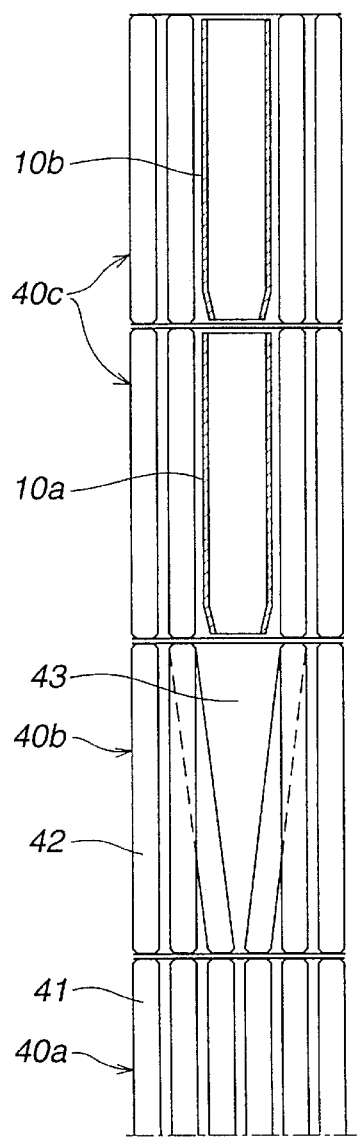
FIG. 4 shows part of a fuel assembly comprising a steam pipe according to a second embodiment of the invention.

FIG. 4 shows part of a fuel assembly according to a second embodiment of the invention. The fuel assembly comprises a number of fuel units 40a–40c which all have fuel rods arranged in a polar lattice comprising three concentric rings. In the lower part of the fuel assembly, fuel units 40a are arranged. All the fuel rod positions in the fuel unit 40a are occupied. In the fuel unit 40b, all the fuel rod positions are also occupied. The fuel rods 42 have a smaller diameter than the fuel rods 41 in the fuel unit 40a. The fuel rods in the inner rings are inclined outwards from the centre of the rings so as to form an empty volume in the centre. The fuel rods are not inclined in the direction of the ring, as is the case in the first embodiment. In this way, no eddy is formed which separates the steam from the water. One advantage of inclining the fuel rods outwards is that the water accompanies the fuel rods, and in this way a certain separation of water and steam occurs. In the fuel units 40c, the fuel rod positions in the inner ring are unoccupied and, instead, a steam pipe 10a, 10b is arranged in the centre. The steam pipes have the same design as has been described above. The advantage of this embodiment is that it is simpler to manufacture than the first-embodiment.

Figure 5:
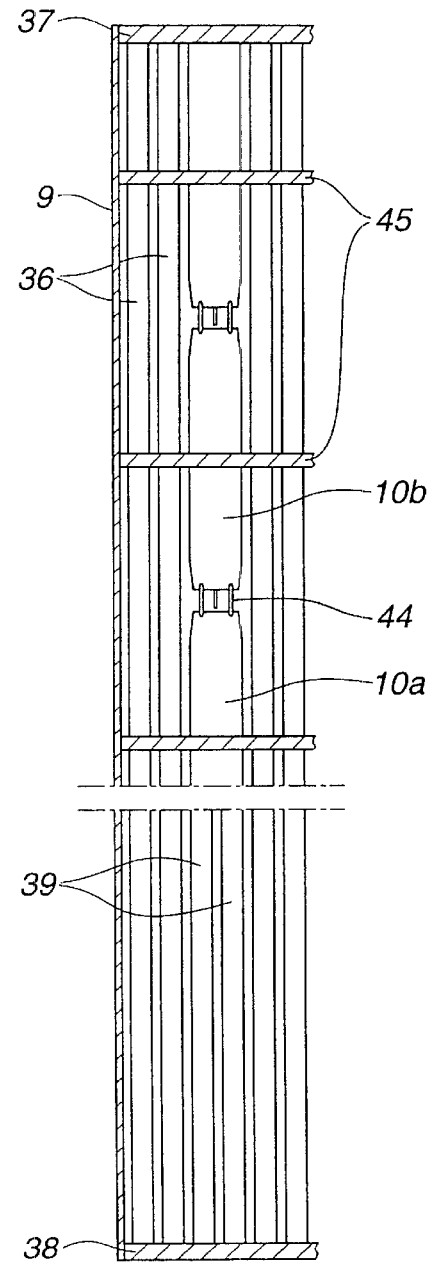
FIG. 5 shows part of a fuel assembly comprising a steam pipe according to a third embodiment of the invention.

FIG. 5 shows part of a fuel assembly according to a third embodiment of the invention. The fuel assembly comprises a top tie plate 37, a bottom tie plate 38 and a plurality of full-length fuel rods 36 which are arranged between the top tie plate and the bottom tie plate. Further, the fuel assembly comprises a number of part-length fuel rods 39 which extend from the bottom tie plate and terminate far below the top tie plate. Above these part-length fuel rods, a plurality of steam pipes 10a, 10b are arranged. The steam pipes are arranged one above the other. Between the steam pipes, spacer elements 44 are arranged to keep the steam pipes in spaced relationship to each other and to fix the steam pipes to each other. To keep the fuel rods in spaced relationship to each other, a number of spacers 45 are arranged in spaced relationship to each other along the fuel assembly in the longitudinal direction thereof. The steam pipes are attached to the spacers. The steam pipes are designed in the same way as has been described in the preceding embodiments.

What is claimed is:

1. A fuel assembly for a boiling water reactor adapted during operation of the reactor to allow coolant to flow upwards through the fuel assembly while absorbing heat from a plurality of fuel rods to transform a portion of the water into steam, said fuel assembly comprising:

a first steam pipe arranged with a longitudinal axis parallel to a longitudinal axis of the fuel assembly, wherein the first steam pipe comprises an inlet for the steam arranged in a first end of the first steam pipe, and an outlet for the steam arranged at a second end of the first steam pipe;

a second steam pipe arranged above and spaced from the first steam pipe along the longitudinal direction of the fuel assembly such that an opening is formed between the first and second steam pipes, wherein the outlet of the first steam pipe has an outlet diameter which is larger than an inlet diameter of the inlet of the second steam pipe, wherein fuel rods are arranged laterally with respect to said first and second steam pipes in said fuel assembly, wherein a second end of the second steam pipe comprises means for collecting water on an inside of the second steam pipe and conducting the collected water towards the outlet of the second steam pipe.

2. A fuel assembly according to claim 1, further comprising a third steam pipe arranged above and spaced from the second steam pipe such that an opening is formed between the second and third steam pipes, wherein an outlet of the second steam pipe has a diameter which is larger than a diameter of an inlet of the third steam pipe.

3. A fuel assembly according to claim 1, wherein the second end of the first steam pipe is arranged tapering towards the outlet of the first steam pipe and the first end of the second steam pipe is arranged tapering towards the inlet of the second steam pipe for achieving a venturi effect.

4. A fuel assembly according to claim 1, wherein a distance between the outlet of the first steam pipe and the inlet of the second steam pipe is less than half a diameter of the inlet of the second steam pipe.

5. A fuel assembly according to claim 1, wherein the second end of the first steam pipe comprises means for collecting water on an inside of the first steam pipe and conducting the collected water towards the outlet of the first steam pipe.

6. A fuel assembly according to claim 5, wherein said means for collecting water comprise a plurality of elongated grooves on the inside of the first steam pipe.

7. A fuel assembly for a boiling water reactor adapted during operation of the reactor to allow coolant to flow upwards through the fuel assembly while absorbing heat from a plurality of fuel rods to transform a portion of the water into steam, said fuel assembly comprising:

a first steam pipe arranged with a longitudinal axis parallel to a longitudinal axis of the fuel assembly, wherein the first steam. pipe comprises an inlet for the steam arranged in a first end of the first steam pipe, and an outlet for the steam arranged at a second end of the first steam pipe;

a second steam pipe arranged above and spaced from the fist steam pipe along the longitudinal direction of the fuel assembly such that an opening is formed between the first and second steam pipes, wherein the outlet of the first steam pipe has an outlet diameter which is larger than an inlet diameter of the inlet of the second steam pipe, wherein fuel rods are arranged laterally with respect to said first and second steam pipes in said fuel assembly, wherein the second end of the first steam pipe comprises means for collecting water on an inside of the first steam pipe and conducting the collected water towards the outlet of the first steam pipe, wherein said means for collecting water comprise a plurality of lugs arranged around the outlet of the first steam pipe.

8. A fuel assembly according to claim 1, wherein the fuel assembly comprises at least two fuel units stacked on top of each other, each fuel unit comprising a top tie plate, a bottom tie plate, a plurality of fuel rods extending between the top tie plate and the bottom tie plate, and one of said first and second steam pipes.

9. A fuel assembly according to claim 8, wherein the first end of the first steam pipe is attached to the bottom tie plate and the second end of the first steam pipe is attached to the top tie plate.

10. A fuel assembly for a boiling water reactor adapted during operation of the reactor to allow coolant to flow upwards through the fuel assembly while absorbing heat from a plurality of fuel rods to transform a portion of the water into steam, said fuel assembly comprising:

a first steam pipe arranged with a longitudinal axis parallel to a longitudinal axis of the fuel assembly, wherein the first steam pipe comprises an inlet for the steam arranged in a first end of the first steam pipe, and an outlet for the steam arranged at a second end of the first steam pipe;

a second steam pipe arranged above and spaced from the first steam pipe along the longitudinal direction of the fuel assembly such that an opening is formed between the first and second steam pipes, wherein the outlet of the first steam pipe has an outlet diameter which is larger than an inlet diameter of the inlet of the second steam pipe, wherein fuel rods are arranged laterally with respect to said first and second steam pipes in said fuel assembly, wherein the second end of the first steam pipe comprises means for collecting water on an inside of the first steam pipe and conducting the collected water towards the outlet of the first steam pipe, wherein a second end of the second steam pipe comprises means for collecting water on an inside of the second steam pipe and conducting the collected water towards the outlet of the second steam pipe.

* * * * *